(12) United States Patent
Yamada et al.

(10) Patent No.: US 6,300,013 B1
(45) Date of Patent: Oct. 9, 2001

(54) MATERIAL FOR NEGATIVE ELECTRODE AND NONAQUEOUS-ELECTROLYTE BATTERY INCORPORATING THE SAME

(75) Inventors: Shinichiro Yamada; Takuya Endo; Hiroshi Imoto; Guohua Li, all of Kanagawa; Hiroaki Tanizaki, Fukushima, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/549,199

(22) Filed: Apr. 13, 2000

(30) Foreign Application Priority Data

| Apr. 14, 1999 | (JP) | ................................. P11-107158 |
| Dec. 22, 1999 | (JP) | ................................. P11-365065 |
| Dec. 22, 1999 | (JP) | ................................. P11-365066 |

(51) Int. Cl.$^7$ ..................................................... H01M 4/58
(52) U.S. Cl. ..................... 429/231.8; 429/212; 429/217; 429/218.1; 429/231.4; 429/231.6; 429/231.9; 429/231.95
(58) Field of Search ..................... 429/212, 217, 429/218.1, 231.4, 231.6, 231.8, 231.9, 231.95

(56) References Cited

U.S. PATENT DOCUMENTS 5,922,491 * 7/1999 Ikawa et al. ......................... 429/218
6,007,945 * 12/1999 Jacobs et al. ......................... 429/218
6,051,340 * 4/2000 Kawakami et al. ............. 429/231.95

\* cited by examiner

*Primary Examiner*—Carol Chaney
*Assistant Examiner*—Dah-Wei D. Yuan
(74) *Attorney, Agent, or Firm*—Sonnenschein, Nath & Rosenthal (57) ABSTRACT

A material for a negative electrode capable of preventing change in the volume of an active material occurring when lithium is doped/dedoped to improve resistance against cycle operations. A material for a negative electrode contains a mixture of a non-carbon material and a carbon material, wherein when an assumption is made that the average particle size of the non-carbon material is $R_M$ and the average particle size of the carbon material is $R_C$, the ratio $R_M/R_C$ is not higher than one, and when an assumption is made that the weight of the non-carbon material is $W_M$ and the weight of the carbon is $W_C$, the ratio $W_M/W_C$ is not higher than one or a mixture of a silicon compound and a carbon material, wherein when an assumption is made that the average particle size of the silicon compound is $R_{Si}$ and the average particle size of the carbon material is $R_C$, the ratio $R_{Si}/R_C$ is not higher than one.

14 Claims, 1 Drawing Sheet

FIG.1

MATERIAL FOR NEGATIVE ELECTRODE AND NONAQUEOUS-ELECTROLYTE BATTERY INCORPORATING THE SAME

BACKGROUND OF THE INVENTION

1. Field of the Invention

The present invention relates to a material for a negative electrode composed of a mixture of a non-carbon material and carbon material and a nonaqueous-electrolyte battery incorporating the material for a negative electrode. More particularly, the present invention relates to a material for a negative electrode exhibiting excellent resistance against cycle operations realized by specifying the particle size of each of the non-carbon material and the carbon material and a nonaqueous-electrolyte battery incorporate the foregoing material.

2. Description of the Related Art

Hitherto, a multiplicity of portable electronic apparatuses, such as camcoders, portable telephones and laptop computers have made their appearance in recent years. The size and weight of the electronic apparatuses have been required. Studies have energetically been performed to improve the energy density of the secondary battery which serves as the power source for the electronic apparatus. In particular, lithium-ion secondary batteries have been expected because the lithium-ion battery permits a considerably high energy density as compared with that realized by the conventional lead batteries and the nickel-cadmium batteries.

As the material of the negative electrode of the lithium-ion battery, a carbon material, such as non-graphitizable carbon or graphite, has widely been used. The reason for this lies in that the foregoing carbon material has a relatively large capacity and capable of realizing satisfactory resistance against cycle operations.

Since the capacity has been enlarged in recent years, the foregoing carbon materials suffer from unsatisfactory capacities. Therefore, a further improvement in the performance has been required. Hence it follows that studies of materials for the negative electrode, such as silicon and tin, exhibiting larger capacities have energetically been performed so as to be substituted for the conventional carbon materials.

The non-carbon material for the negative electrode suffers from excessive change in the volume of the active material thereof occurring when lithium is doped/dedoped. Therefore, excessive deterioration in the resistance against cycle operations takes place, causing application of the foregoing carbon material to the battery to be inhibited.

SUMMARY OF THE INVENTION

In view of the foregoing, an object of the present invention is to provide a material for a negative electrode which is capable of preventing change in the volume of the active material occurring when lithium is doped/dedoped and improving the resistance against cycle operations and a nonaqueous-electrolyte battery incorporating the material for a negative electrode.

To achieve the foregoing object, according to one aspect of the invention, there is provided a material for a negative electrode comprising: a mixture of a non-carbon material and a carbon material, wherein when an assumption is made that the average particle size of the non-carbon material is $R_M$ and the average particle size of the carbon material is $R_C$, the ratio $R_M/R_C$ is not higher than one, and when an assumption is made that the weight of the non-carbon material is $W_M$ and the weight of the carbon is $W_C$, the ratio $W_M/W_C$ is not higher than one.

According to another aspect of the invention, there is provided a material for a negative electrode comprising: a mixture of a silicon compound and a carbon material, wherein when an assumption is made that the average particle size of the silicon compound is $R_{Si}$ and the average particle size of the carbon material is $R_C$, the ratio $R_{Si}/R_C$ is not higher than one.

The material for a negative electrode according to the present invention has the structure that the ratio of the particle size of the silicon compound and the carbon material is specified. Therefore, change in the volume of the silicon compound occurring when lithium is doped/dedoped can be absorbed by the carbon material. Thus, change in the overall volume of the material for a negative electrode can be prevented.

Other objects, features and advantages of the invention will be evident from the following detailed description of the preferred embodiments described in conjunction with the attached drawings.

DETAILED DESCRIPTION OF THE PREFERRED EMBODIMENTS

Embodiments of the present invention will now be described.

Figure 1:
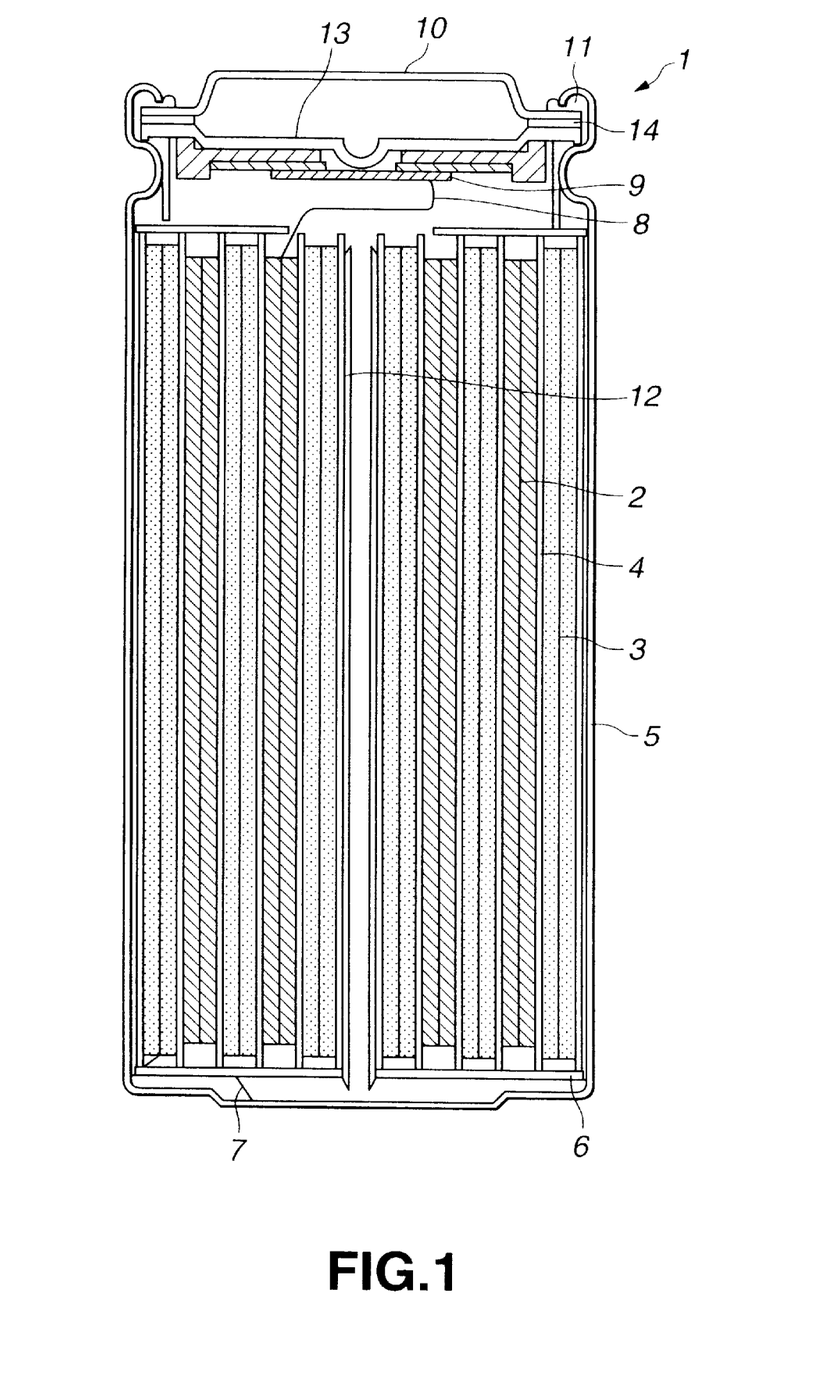
FIG. 1 is a cross sectional view showing an example of the structure of a nonaqueous-electrolyte battery according to the present invention.

FIG. 1 is a vertical cross sectional view showing an example of the structure of a nonaqueous-electrolyte battery according to the embodiment of the present invention. The nonaqueous-electrolyte battery 1 according to this embodiment incorporates a wound member constituted by winding a film-shape positive electrode 2 and a film-shape negative electrode 3 through a separator 4 such that a hermetic state is maintained. The wound member is accommodated in a battery can 5. Nonaqueous electrolytic solution is enclosed in the battery can 5.

The positive electrode 2 is manufactured by forming a positive-electrode active material layer which is formed by applying a positive-electrode mix containing a positive-electrode active material and a binder to the surface of a collector of the positive electrode and by drying the collector. The collector of the positive electrode is constituted by metal foil, such as aluminum foil.

The positive-electrode active material may be composed of metal oxide, metal sulfide or a specific polymer to correspond to the type of a required battery.

When, for example, a lithium primary battery is manufactured, the positive-electrode active material may be $TiS_2$, $MnO_2$, graphite, $FeS_2$ or the like. When lithium secondary battery is manufactured, the positive-electrode active material may be metal sulfide or metal oxide, such as $TiS_2$, $MoS_2$, $NbSe_2$ or $V_2O_5$.

When the lithium secondary battery is manufactured, the positive-electrode active material may be a lithium composite oxide mainly composed of $Li_xMO_2$ (where M is one or more types of transition metal and x varies according to a charge/discharge state of the battery and usually satisfies the relationship that $0.05 \leq x \leq 1.10$). It is preferable that the transition metal for composing the lithium composite oxide is Co, Ni or Mn. The lithium composite oxide is exemplified by $LiCoO_2$, $LiNiO_2$, $Li_xNi_yCo_{1-y}O_2$ (where each of x and y vary according to charge/discharge state of the battery and usually satisfies the relationship that 0<x<1 and 0.7<y<1.02) and $LiMn_2O_4$.

The lithium composite oxide capable of generating high voltage is a positive-electrode active material excellent in the energy density. The positive electrode 2 may be composed of a plurality types of the foregoing positive-electrode active materials.

The binder of the positive-electrode mix may be a known binder which is usually employed in the positive-electrode mix of the battery of the foregoing type. As an alternative to this, known additives may be added to the foregoing positive-electrode mix.

The negative electrode 3 is manufactured by forming a negative-electrode active material layer which is formed by applying a negative-electrode mix containing a negative-electrode active material and a binder to the surface of a collector of the negative electrode and by drying the collector. The collector of the negative electrode is constituted by metal foil, such as copper foil.

The nonaqueous-electrolyte secondary battery 1 according to this embodiment incorporates the negative-electrode active material composed of a mixture of a non-carbon material and a carbon material.

The mixture of the non-carbon material and the carbon material structured such that when an assumption is made that the average particle size of the non-carbon material is $R_M$ and the average particle size of the carbon material is $R_C$, the ratio $R_M/R_C$ is not higher than one. Moreover, when an assumption is made that the weight of the non-carbon material is $W_M$ and the weight of the carbon is $W_C$, the ratio $W_M/W_C$ is not higher than one.

The non-carbon material may be an alloy expressed by general formula $Li_xMM'$ (where each of M and M' is an element except for Li and C and satisfying the relationship that $x \geq 0.01$). The non-carbon material of the foregoing type may be a silicon compound, a tin compound, an indium compound or an aluminum compound.

When either of M or M' is a compound containing an element which constitutes the general formula $Li_xMM'$ (where each of M and M' is an element except for Li and C and satisfying the relationship that $x \geq 0.01$) in association with lithium in the silicon compound, the tin compound, the indium compound or the aluminum compound, the other material M or M' may be a non-carbon element which is inactive with respect to lithium.

It is preferable that x in the general formula is 0.01 or more, more preferably 0.1 or more.

The silicon compound may be a compound expressed by general formula $M_xSi$. In the general formula, M is an element except for Li and Si. Specifically, the element is exemplified by B, C, N, O, Na, Mg, Al, P, S, K, Ca, Ti, V, Cr, Mn, Fe, Co, Ni, Cu, Zn, Rb, Y, Mo, Rh, Pd, In, Sn, Cs, Ba, Ce or Ta.

It is preferable that x in the general formula is 0.01 or more, more preferably 0.1 or more.

The carbon material may be non-graphitizable carbon material having a structure that the distance between plane (002) is, for example, 0.37 nm or longer. As an alternative to this, the carbon material may be a graphite material or a graphitizable carbon material having a structure that the distance between plane (002) is, for example, 0.340 nm or longer.

Specifically, the carbon material is exemplified by pyrocarbon, cokes, graphite, vitreous carbon, a material obtained by baking an organic polymer, carbon fibers and active carbon. Cokes include pitch cokes, needle cokes and petroleum cokes. The material obtained by baking an organic polymer is a material obtained by baking phenol resin or furan resin at an appropriate temperature.

The carbon material is broadly divided into amorphous carbon, graphite and diamond. The carbon materials except for diamond are categorized into a material which can easily be formed into a graphite structure (graphitizable carbon) and a material which cannot easily be formed into the graphite structure (non-graphitizable carbon). Although graphitizable carbon is formed limitlessly closer to the graphite structure when the baking temperature is raised, the non-graphitizable is not formed into the graphite structure.

Non-graphitizable carbon, the graphite material and the graphitizable carbon are defined as follows.

A fact is known that the spacing d002 between interlayer planes (002) of carbon into which lithium has been doped is 0.370 nm. Therefore, it can be considered that the interlayer distance is enlarged when lithium has been doped if d002 is 0.340 nm to 0.360 nm like the conventional carbonaceous material. The carbonaceous material satisfying d002<0.370 nm must enlarge the interlayer space. Therefore, lithium cannot easily be doped. It leads to a fact that the quantity of doping is reduced.

The true density $\rho$ has a close relationship with the interlayer distance. When $\rho > 1.70$ g/cm$^3$, the foregoing interlayer distance cannot easily be obtained. Also in this case, the quantity of doping is reduced.

Carbon which has a layered structure (even if it is an incomplete graphite structure) somewhat closer to the graphite structure and which can easily be formed into the graphite structure, that is, graphitizable carbonaceous material has a spacing d002 which is 0.372 nm owing to intercalation (doping) of Li.

Then, the baking temperature of the foregoing graphitizable carbonaceous material is raised to grow the graphite structure, the spacing d002 is made closer to that (=0.335 nm) of graphite.

As a result of the foregoing limitation, an appropriate spacing d002 of carbon having a structure similar to graphite, that is, graphitizable carbon, satisfies $0.335 \leq d002 \leq 0.372$. To smoothly dope Li, it is preferable that the spacing d002 is near 0.372 nm. When the spacing d002 is somewhat enlarged, the baking temperature must be lowered. As a result, carbonization cannot sufficiently be performed, causing the performance as the element (stability of a doped material) to deteriorate.

To stabilize the doped material, carbonization must be allowed to sufficiently proceed to raise the density $\rho$, that is, the lower limit of $\rho$ must be enlarged to 1.70, preferably 1.80, and most preferably 1.86 (Therefore, the spacing d002 must be shortened).

However, in the foregoing case, the spacing d002 must be considerably smaller than 0.372 nm. Therefore, a phenomenon that the spacing is enlarged when Li is doped cannot be prevented, causing smooth proceeding of the doping reaction to be inhibited. Hence it follows that the quantity of Li which must be doped cannot satisfactorily be enlarged. As described above, carbon having a long spacing d002 and permitted to sufficiently be carbonized cannot be obtained from the graphitizable carbonaceous material.

Carbon which can be obtained by introducing functional groups having a structure that oxygen is contained in petroleum pitch by 10% to 20% to perform oxygen linking and by baking the material is an example of the carboneous material obtainable from the non-graphitizable carboneous material. The foregoing carboneous lithium is not formed into the graphite structure even if it is baked at a high temperature. The spacing d002 of the material baked at, for example, 1200° C. is 0.370 nm or longer. Therefore, the foregoing carboneous material has doping performance superior to that of the graphitizable carboneous material (cokes or the like). Moreover, sufficient carbonization is permitted and stable performance is allowed during cycles performed in a long time.

In addition, the non-graphitizable carboneous material has a disordered-structure. As distinct from the foregoing graphitizable carboneous material, the non-graphitizable carboneous material is a different carboneous material which is not formed into the graphite structure.

The carbon material may be solely or plural types of the carbon materials may be mixed. In particular, it is preferable that the carbon material contains at least non-graphitizable carbon. The non-graphitizable carbon may be a mixture of the graphitizable carbon and the graphite material at an arbitrary ratio.

The nonaqueous-electrolyte battery 1 has a structure that when an assumption is made that the average particle size of the non-carbon material in the negative-electrode active material is $R_M$ and the average particle size of the carbon material is $R_C$, the ratio $R_M/R_C$ of the particle size of the non-carbon material and that of the carbon material is not higher than one. That is, the average particle size of the non-carbon material in the negative-electrode active material is smaller than that of the carbon material. When the average particle size of the non-carbon material is smaller than that of the carbon material, the non-carbon material are introduced into voids formed by the carbon material having the larger particle size.

When the average particle size of the silicon compound in the negative-electrode active material of the nonaqueous-electrolyte battery 1 is $R_{Si}$ and that of the carbon material is $R_C$, the ratio $R_{Si}/R_C$ of the particle size of the silicon compound and that of the carbon material is not higher than one. That is, the average particle size of the silicon compound in the negative-electrode active material is smaller than that of the carbon material. When the average particle size of the silicon compound is smaller than that of the carbon material, the silicon compound is introduced into voids formed by the carbon material having the larger particle size.

That is, the nonaqueous-electrolyte battery 1 according to this embodiment has the negative electrode containing the non-carbon material and the carbon material and including voids formed by the carbon material having the larger particle size. The voids are used as portions in which lithium of the non-carbon material having the smaller particle size is doped/dedoped. Since lithium of the non-carbon material is doped/dedoped in the voids formed by the carbon material, change in the volume of the non-carbon material occurring due to expansion/contraction of the non-carbon material which takes place owing to doping/dedoping of lithium can be absorbed by the voids formed by the carbon material. Therefore, change in the overall volume of the negative-electrode active material can be prevented. Since the change in the volume of the negative-electrode active material occurring owing to doping/dedoping of lithium can be prevented, the resistance against cycle operations of nonaqueous-electrolyte battery 1 can considerably be improved.

If the ratio $R_M/R_C$ is higher than one, that is, if the average particle size of the non-carbon material is larger than that of the carbon material, change in the volume of the non-carbon material occurring due to doping/dedoping of lithium cannot be absorbed by the carbon material. When the ratio $R_M/R_C$ is not higher than one, change in the volume of the negative-electrode active material occurring due to doping/dedoping of lithium can be prevented. As a result, resistance against cycle operations of the nonaqueous-electrolyte battery 1 can be improved.

The average particle size of the carbon material and that of the non-carbon material will now be described. The size of particles having an irregular shape can be expressed by a variety of methods. In this embodiment, the relationship that $R_M/R_C$ is not higher than one is simply required. Therefore, the method of measuring the particle size and the average particle size is not limited.

That is, the nonaqueous-electrolyte battery 1 according to this embodiment has the negative electrode containing the silicon compound and the carbon material and including voids formed by the carbon material having the larger particle size. The voids are used as portions in which lithium of the silicon compound having the smaller particle size is doped/dedoped. Since lithium of the silicon compound is doped/dedoped in the voids formed by the carbon material, change in the volume of the silicon compound occurring due to expansion/contraction of the silicon compound which takes place owing to doping/dedoping of lithium can be absorbed by the voids formed by the carbon material. Therefore, change in the overall volume of the negative-electrode active material can be prevented. Since the change in the volume of the negative-electrode active material occurring owing to doping/dedoping of lithium can be prevented, the resistance against cycle operations of nonaqueous-electrolyte battery 1 can considerably be improved.

If the ratio $R_{Si}/R_C$ is higher than one, that is, the average particle size of the silicon compound is larger than that of the average particle size of the carbon material, change in the volume of the silicon compound occurring due to doping-dedoping of lithium cannot be absorbed by the carbon material. When the ratio $R_{Si}/R_C$ is not higher than one, change in the bolume of the negative-electrode active material occurring when lithium is doped/dedoped can be prevented. As a result, the resistance against cycle operations of the nonaqueous-electrolyte battery 1 can be improved.

It is preferable that the average particle size $R_C$ of the carbon material contained in the negative-electrode active material is about 10 $\mu$m to 70 $\mu$m. The shape of the carbon material is not limited. Therefore, the carbon material may be formed into any one of a variety of shapes including a grain shape and a flaky shape.

It is preferable that the average particle size $R_{Si}$ of the silicon compound contained in the negative-electrode active material is about 10 $\mu$m or smaller, more preferably about 1 $\mu$m or smaller.

The average particle size of the carbon material and that of the silicon compound will now be described. The size of particles having an irregular shape can be expressed by a variety of methods. In this embodiment, the relationship that $R_{Si}/R_C$ is not higher than one is simply required. Therefore, the method of measuring the particle size and the average particle size is not limited.

The particle size can be measured by, for example, a method of screening particles to determine the particle size in accordance with the size of the particles inhibited from passage. Another method may be employed with which particles are settled in solution to measure the settling speed and the particle size. Moreover, a stokes method employed to detected the particle size (the stokes size). The stokes size indicates the size of spherical particles which have the same size and which settle at the same speed as the sample particles under the same conditions.

Usually, powder is composed of particle groups having various sizes. If powder has various particle size, it is convenient that R is employed as a representative value in a case where the same effect for a certain phenomenon is obtained as an effect obtainable from the same particle size which is R. Therefore, the method of obtaining the average particle size varies according to the object. Specifically, the average particle size is obtained by, for example, a length average size ($\Sigma nR/\Sigma n$). Note that the method is not limited to the foregoing method. Note that R is the particle size of each particles and n is the number of particles.

It is preferable that the average particle size $R_C$ of the carbon material contained in the negative-electrode active material is about 10 $\mu$m to about 70 $\mu$m. The shape of the carbon material is not limited. Therefore, a carbon material formed into any one of a variety of shapes may be employed which include a grain shape and a flake shape.

It is preferable that the average particle size $R_M$ of the non-carbon material contained in the negative-electrode active material is about 20 $\mu$m or smaller, more preferably about 10 $\mu$m or smaller.

The nonaqueous-electrolyte battery 1 contains the mixture of the non-carbon material and the carbon material which satisfies the relationship that when an assumption is made that the weight of the non-carbon material is $W_M$ and that of the carbon material is $W_C$, the ratio $W_M/W_C$ of $W_M$ and $W_C$ is not higher than one.

That is, the weight of the carbon material is heavier than that of the non-carbon material. Since the weight of the carbon material is made to be heavier than that of the non-carbon material, change in the volume of the non-carbon material occurring due to expansion/contraction of the non-carbon material when lithium is doped/dedoped can be absorbed by the heavier carbon material. Therefore, the overall change in the negative-electrode active material can be prevented. Since change in the volume of the negative-electrode active material occurring when lithium is doped/dedoped is prevented, the resistance against cycle operations of the nonaqueous-electrolyte battery 1 can significantly be improved.

If the ratio $W_M/W_C$ is higher than one, that is, the weight of the non-carbon material is heavier than that of the carbon material, change in the volume of the non-carbon material occurring when lithium is doped/dedoped cannot be absorbed by the carbon material. Therefore, the ratio $W_M/W_C$ is made to be not higher than one to prevent change in the volume of the negative-electrode active material occurring when lithium is doped/dedoped. As a result, the resistance against cycle operations of the nonaqueous-electrolyte battery 1 can significantly be improved.

The nonaqueous electrolytic solution is prepared by dissolving an electrolyte in nonaqueous solvent.

The electrolyte may be a known electrolyte which is usually employed in electrolytic solution of a battery of the foregoing type. Specifically, lithium salt may be employed which is exemplified by $LiClO_4$, $LiAsF_6$, $LiPF_6$, $LiBF_4$, $LiB(C_6H_5)_4$, $CH_3SO_3Li$, $CF_3SO_3Li$, $LiCl$ and $LiBr$.

The nonaqueous solvent may be any one of a variety of known nonaqueous solvent materials for use in the non-aqueous electrolytic solution. Specifically, any one of the following materials may be employed: propylene carbonate, ethylene carbonate, dimethyl carbonate, diethyl carbonate, 1,2-dimethoxyethane, 1,2-diethoxyethane, $\gamma$-butyrolactone, tetrahydrofuran, 2-methyltetrahydrofuran, 1,3-dioxolane, 4-methyl-1, 3-dioxolane, dimethylether, sulfolane, methylsulfolane, acetonitrile, propionitrile, anisole, ester acetate, ester butyrate and propionate. The foregoing nonaqueous solvent may solely be employed or their mixture may be employed.

The nonaqueous-electrolyte battery 1 has the structure that the ratio of the particle size of the non-carbon material and that of the carbon material contained in the negative electrode is specified. Therefore, change in the volume of the negative electrode active material occurring when lithium is doped/dedoped can be prevented. Thus, the resistance against cycle operations can significantly be improved.

The nonaqueous-electrolyte battery 1 is manufactured as follows.

The positive electrode 2 is manufactured by forming a positive-electrode active material layer by uniformly applying a positive-electrode mix containing the positive-electrode active material and the binder to the surface of metal foil, such as aluminum foil, serving as a collector of the positive electrode and by drying the collector. The binder of the positive-electrode mix may be a known binder. Moreover, known additive may be added to the positive-electrode mix.

The negative electrode 3 is manufactured by pulverizing and classifying the non-carbon material and the carbon material to prepare powder of the non-carbon material and that of the carbon material. Then, obtained powder materials are mixed with each other so that a material for the negative electrode composed of the mixture of the non-carbon material and the carbon material is prepared. Then, the binder is mixed in the material for the negative electrode so that the negative-electrode mix is prepared. The negative-electrode mix is uniformly applied to the surface of metal foil, such as copper foil, serving as a collector of the negative electrode. Then, the metal foil is dried so that a negative-electrode active material layer is formed. Then, the formed structure is molded by a pressing process using a pressing machine so that the negative electrode 3 is manufactured. The binder for the negative-electrode mix may be a known binder. Moreover, known additives and the like may be added to the negative-electrode mix.

It is preferable that the carbon material and the non-carbon material are pulverized and classified in an atmosphere of inactive gas. Since the carbon material and the non-carbon material are pulverized and classified in the atmosphere of inactive gas, an accident, such as explosion of dust or fire, can be prevented. Therefore, the pulverizing operation and the classifying operation can safely be performed.

It is preferable that the carbon material and the non-carbon material are mixed with each other in an atmosphere of inactive gas. Since the carbon material and the non-carbon material are mixed with each other in the atmosphere of inactive gas, an accident such as explosion of dust or fire, can be prevented. Therefore, the mixing operation can safely be performed.

It is preferable that the negative-electrode mix is applied to the metal foil and the metal foil is dried in an atmosphere of inactive gas or an atmosphere of dry air. Since the negative-electrode mix is applied to the metal foil and the metal foil is dried in the atmosphere of inactive gas or the atmosphere of dry air, deterioration in the quality of the negative electrode 3 occurring due to absorption of the moisture content in the air to the negative-electrode mix can be prevented. As a result, the quality of each of the negative electrode 3 and the nonaqueous-electrolyte battery 1 can be improved. Note that the dry air atmosphere is an atmosphere in which the dew-point is −10° C. or lower.

It is preferable that the operation for pressing the negative-electrode mix is performed by hot press. Note that the hot press is a pressing step which is performed at a temperature not lower than 60° C. When the negative-electrode mix is subjected to the hot press when the negative electrode 3 is manufactured, deterioration in the quality of the negative electrode 3 can be prevented which occurs due to adsorption of the moisture content in the air to the negative-electrode mix. Moreover, the non-carbon material layer and the carbon material layer can uniformly be bonded to each other. Therefore, the hot press of the negative-electrode mix permits the qualities of the manufactured negative electrode 3 and the nonaqueous-electrolyte battery 1 to be improved. It is preferable that the hot press of the negative-electrode mix is performed in an atmosphere of an inactive gas or an atmosphere of dry air. When the hot press of the negative-electrode mix is performed in the atmosphere of the inactive gas or the atmosphere of dry air, the foregoing effect can furthermore be improved. Note that the dry air atmosphere is an atmosphere in which the dew-point is −10° C. or lower.

The thus-obtained positive electrode 2 and the negative electrode 3 are brought into hermetic contact with each other through the separator 4 constituted by, for example, fine-porous polypropylene film. Then, the formed structure is wound multiple times so that a wound member is formed.

It is preferable that the winding process for forming the wound member is performed in an atmosphere of inactive gas or an atmosphere of dry air. Since the winding process for forming the wound member is performed in the atmosphere of inactive gas or the atmosphere of dry air, deterioration in the quality of the negative electrode 3 occurring due to adsorption of the moisture content in the air to the negative-electrode mix can be prevented. Therefore, the quality of each of the manufactured negative electrode 3 and the nonaqueous-electrolyte battery 1 can be improved. Note that the dry air atmosphere is an atmosphere in which the dew-point is −10°C. or lower.

Then, an insulating plate 6 is inserted into the bottom of an iron battery can 5 having the inside surface subjected to nickel plating. Then, the foregoing wound member is introduced. To realize a collecting mechanism, an end of a negative-electrode lead 7 made of, for example, nickel, is crimped to the negative electrode 3. Moreover, another end of the negative-electrode lead 7 is welded to the battery can 5. As a result, the battery can 5 is electrically connected to the negative electrode 3 so that the battery can 5 serves as an outer negative electrode of the nonaqueous-electrolyte battery 1. To realize a collecting mechanism, an end of a positive-electrode lead 8 made of, for example, aluminum, is joined to the positive electrode 2. Another end of the positive-electrode lead 8 is electrically connected to a battery cover 10 through a thin plate 9 for breaking an electric current. The thin plate 9 for breaking an electric current breaks an electric current to correspond to the internal pressure of the battery. Thus, the battery cover 10 is electrically connected to the positive electrode 2 so that the battery cover 10 serves as an outer positive electrode of the nonaqueous-electrolyte battery 1.

Then, nonaqueous electrolytic solution is introduced into the battery can 5. The nonaqueous electrolytic solution is prepared by dissolving the electrolyte in the nonaqueous solvent.

It is preferable that the process for introducing the nonaqueous electrolytic solution into the battery can 5 is performed in an atmosphere of inactive gas or an atmosphere of dry air. Since the injection process is performed in the atmosphere of the inactive gas or the atmosphere of dry air, deterioration in the quality of the negative electrode 3 occurring due to adsorption of the moisture content in the air to the nonaqueous electrolytic solution can be prevented. Thus, the quality of each of manufactured the negative electrode 3 and that of the manufactured nonaqueous-electrolyte battery 1 can be improved. Note that the dry air atmosphere is an atmosphere in which the dew-point is −10° C. or lower.

Then, the battery can 5 is caulked through a gasket 11 to which asphalt is applied and arranged to insulating and sealing the opening so that the battery cover 10 is secured. As a result, the cylindrical nonaqueous-electrolyte battery 1 can be manufactured.

As shown in FIG. 1, the nonaqueous-electrolyte battery 1 is provided with a center pin 12 for connecting the negative-electrode lead 7 to the positive-electrode lead 8. Moreover, the nonaqueous-electrolyte battery 1 incorporates a safety valve unit 13 for removing internal gas when the pressure in the nonaqueous-electrolyte battery 1 has been raised to a level higher than a predetermined level. In addition, the nonaqueous-electrolyte battery 1 incorporates a PTC (Positive Temperature Coefficient) device 14 for preventing rise in the temperature in the nonaqueous-electrolyte battery 1.

The method of manufacturing the nonaqueous-electrolyte battery 1 incorporating the negative electrode 3 constituted by the mixture of the silicon compound and the carbon material is similar to that for manufacturing the nonaqueous-electrolyte battery 1 incorporating the negative electrode 3 constituted by the mixture of the non-carbon material and the carbon material. That is, the silicon compound may be substituted for the non-carbon material.

In the foregoing embodiment, the particle size ratio of the silicon compound and the carbon material in the negative-electrode active material of the nonaqueous-electrolyte battery 1 is measured. As an alternative to this, the weight ratio of the silicon compound and the carbon material may be measured.

Assuming that the weight of the silicon compound contained in the negative-electrode active material of the nonaqueous-electrolyte battery 1 is $W_{Si}$ and the weight of the carbon material is $W_C$, the weight ratio $W_{Si}/W_C$ of the silicon compound and the carbon material is made to be not higher than one.

That is, the weight of the carbon material is heavier than the weight of the silicon compound. Since the weight of the carbon material is heavier than that of the silicon compound, change in the volume of the silicon compound occurring due to expansion/contraction of the silicon control when lithium is doped/dedoped can be absorbed by the heavier carbon material. As a result, change in the overall volume of the negative-electrode active material can be prevented. Since change in the volume of the negative-electrode active material occurring when lithium is doped/dedoped can be prevented the resistance against cycle operations of the nonaqueous-electrolyte battery 1 can significantly be improved.

If ratio $W_{Si}/W_C$ is higher than one, that is, the weight of the silicon compound is heavier than that of the carbon material, change in the lithium of the silicon compound occurring due to doping/dedoping of lithium cannot be absorbed by the carbon material. Since the ratio $W_{Si}/W_C$ is not higher than one, change in the volume of the negative-electrode active material occurring when lithium is doped/dedoped can be prevented. Thus, the resistance against cycle operations of the nonaqueous-electrolyte battery 1 can significantly be improved.

In this embodiment, the nonaqueous-electrolyte battery 1 incorporating the nonaqueous electrolytic solution prepared by dissolving the electrolyte in the nonaqueous solvent is taken as an example. The present invention may be applied to a battery incorporating a solid electrolyte prepared by dispeR$_{Si}$ng an electrolyte in a matrix polymer and a battery of a type incorporating a gel-type solid electrolyte containing an expandable solvent. The shape of the battery according to the present invention is not limited. For example, a cylindrical shape, a square shape, a coin shape or a button shape may be employed. Also the size is not limited. Thus, a thin-type structure, a large size structure and the like may be employed.

The effects of the present invention was confirmed by manufacturing the above-mentioned nonaqueous-electrolyte battery. The characteristics of the nonaqueous-electrolyte battery were evaluated.

EXAMPLE 1

The negative electrode was manufactured as follows.

Petroleum pitch was employed as a start raw material. Functional groups containing oxygen were introduced by 10% to 20% so that oxygen crosslinking was performed. Then, a baking process was performed at 1000° C. in an atmosphere of inactive gas so that a non-graphitizable carbon material having characteristics similar to those of a vitreous carbon was obtained. Then, X-ray analysis of the obtained material was performed, resulting in the interval of (002) planes was 3.76 Å and the true specific gravity was 1.58 g/cm$^3$.

Then, the obtained non-graphitizable carbon material was pulverized so as to be formed into powder of a carbon material having an average particle size of 50 μm. Then, 60 parts by weight of powder of the carbon material, 30 parts by weight of powder of a silicon compound ($Mg_2Si$) serving as the non-carbon material and having an average particle size of 5 μm and 10 parts by weight of polyvinylidene fluoride were mixed. Thus, a negative-electrode mix was prepared.

Then, negative-electrode mix was dispersed in N-methyl-2-pyrolidone so as to be slurried. The slurry was uniformly applied to the two sides of an elongated copper foil serving as a collector for the negative electrode and having a thickness of 10 μm. Then, the copper foil was dried so that a negative-electrode active material layer was formed. Then, the formed structure was molded by compressing by operating a roll pressing machine so that a negative electrode was manufactured.

Then, a positive electrode was manufactured as follows.

Initially, lithium carbonate and cobalt carbonate were mixed with each other at a ratio of 0.5 mol:1 mol. Then, the mixture was based at 900° C. in the air for 5 hours. Thus, $LiCoO_2$, which was the positive-electrode active material was obtained.

Then, 91 parts by weight of obtained $LiCoO_2$, 6 parts by weight of graphite serving as a conductive material and 3 parts by weight of polyvinylidene fluoride serving as the binder were mixed so that a positive-electrode mix was prepared.

Then, the positive-electrode mix was dispersed in N-methyl-2-pyrolidone so as to be slurried. The slurry was uniformly applied to the two sides of aluminum foil serving as a collector for the positive electrode and having a thickness of 20 μm. Then, the aluminum foil was dried. Thus, a positive-electrode active material layer was formed. Then, the formed structure was molded by compressing by operating a roll pressing machine so that a positive electrode was manufactured.

The thus-obtained positive electrode and the negative electrode were brought into hermetic contact with each other through a separator having a thickness of 25 μm and constituted by a fine-porous polypropylene film. Then, the laminate was wound many times so as to be formed into a spiral shape. Thus, a wound member was manufactured.

Then an insulating plate was inserted into the bottom portion of an iron battery can having the inner surface subjected to nickel plating. Then, the wound member was inserted. To realize a collecting structure of the negative electrode, an end of a negative-electrode lead made of nickel was crimped to the negative electrode. Another end was welded to the battery can. To realize a collecting structure of the positive electrode, an end of a positive-electrode lead made of aluminum was joined to the positive electrode. Another end of the positive-electrode lead was electrically connected to the battery cover through a thin plate for breaking an electric current. The thin plate for breaking an electric current breaks an electric current to correspond to the internal pressure of the battery.

Then, nonaqueous electrolytic solution was enclosed in the battery can. The nonaqueous electrolytic solution was prepared by dissolving $LiPF_6$ at a concentration of 1.0 mol/l in mixed solvent of 50 capacity % of propylene carbonate and 50 capacity % of diethyl carbonate.

Finally, the battery can was caulked through an insulating gasket applied with asphalt and arranged to seal the opening so that the battery cover was secured. As a result, a cylindrical nonaqueous-electrolyte battery having a diameter of about 18 mm and a height of about 65 mm was manufactured.

EXAMPLE 2

A similar process to that according to Example 1 was performed except for the non-carbon material in the negative-electrode mix which was $Mg_2Sn$ having an average particle size of 5 μm. Thus, a nonaqueous-electrolyte battery was manufactured.

EXAMPLE 3

A similar process to that according to Example 1 was performed except for the non-carbon material in the negative-electrode mix which was Al having an average particle size of 5 μm. Thus, a nonaqueous-electrolyte battery was manufactured.

EXAMPLE 4

A similar process to that according to Example 1 was performed except for the non-carbon material in the negative-electrode mix which was in having an average particle size of 5 μm. Thus, a nonaqueous-electrolyte battery was manufactured.

EXAMPLE 5

A similar process to that according to Example 1 was performed except for the carbon material in the negative-electrode mix which was a mixture of non-graphitizable carbon obtained from pitch and natural graphite at the same quantities. Thus, a nonaqueous-electrolyte battery was manufactured.

Comparative Example 1

A similar process to that according to Example 1 was performed except for the average particle size of $Mg_2Si$ the negative-electrode mix which was 100 μm. Thus, a nonaqueous-electrolyte battery was manufactured.

Comparative Example 2

A similar process to that according to Example 2 was performed except for the average particle size of $Mg_2Sn$ the negative-electrode mix which was 100 μm. Thus, a nonaqueous-electrolyte battery was manufactured.

Comparative Example 3

A similar process to that according to Example 3 was performed except for the average particle size of Al the negative-electrode mix which was 100 μm. Thus, a nonaqueous-electrolyte battery was manufactured.

Comparative Example 4

A similar process to that according to Example 4 was performed except for the average particle size of In the negative-electrode mix which was 100 μm. Thus, a nonaqueous-electrolyte battery was manufactured.

Comparative Example 5

A similar process to that according to Example 1 was performed except for the quantity of the carbon material mixed in the negative-electrode mix which was 30 parts by weight and the quantity of $Mg_2Si$ which was 60 parts by weight. Thus, a nonaqueous-electrolyte battery was manufactured.

The resistance against cycle operations of the thus-manufactured nonaqueous-electrolyte batteries according to Examples 1 to 4 and Comparative Examples 1 to 5 were evaluated as follows.

Evaluation of Resistance Against Cycle Operations

Each battery was charged with a constant current of 1A and constant voltage until the voltage was raised to an upper limit of 4.2 V. Then, discharge with a constant current of 500 mA was performed until an end voltage of 2.5 V was realized. Then, 100 cycles each of which was composed of the foregoing processes were repeated. Then a discharge-capacity retention ratio (%) at the 100 th cycle was detected in accordance with the ratio of the discharge capacity at the 100 th cycle with respect to the discharge capacity at the first cycle. Note that the test for evaluating the resistance against cycle operations was performed under an atmosphere, the temperature of which was 20° C.

The discharge-capacity retention ratio of each of the batteries according to Examples 1 to 4 and Comparative Examples 1 to 5 was shown in Table 1. Note that the initial capacities of the batteries according to Examples 1 to 4 and Comparative Example 1 to 5 were substantially the same.

TABLE 1

|  | Discharge-Capacity Retention Ratio (%) |
| --- | --- |
| Example 1 | 93 |
| Example 2 | 91 |
| Example 3 | 85 |
| Example 4 | 88 |
| Example 5 | 88 |
| Comparative Example 1 | 15 |
| Comparative Example 2 | 18 |
| Comparative Example 3 | 13 |
| Comparative Example 4 | 17 |
| Comparative Example 5 | 43 |

The following facts were understood from Table 1.

An assumption was made that the average particle size of the non-carbon material in the negative-electrode mix was $R_M$ and that of the carbon material was $R_C$. The nonaqueous-electrolyte batteries according to Examples 1 to 4 were structured such that the ratio $R_M/R_C$ was not higher than one. Another assumption was made that the weight of the non-carbon material was $W_M$ and that of the carbon material was $W_C$. The nonaqueous-electrolyte batteries according to Examples 1 to 4 were structured such that the ratio $W_M/W_C$ was not higher than one. The discharge-ratio retention ratio of the nonaqueous-electrolyte batteries according Examples 1 to 4 were significantly improved as compared with Comparative Examples 1 to 4. The Comparative Examples 1 to 4 were structured such that the particle size $R_C$ of the carbon material was smaller than the particle size $R_M$ of the non-carbon material. That is, the ratio $R_M/R_C$ was higher than one.

The reason for this was considered as follows. If change in the volume of the non-carbon material occurs when lithium was doped/dedoped, the carbon material absorbed the chance in the volume of the non-carbon material. Thus, the change in the overall volume of the negative-electrode active material was prevented.

As a result, the above-mentioned effect can be obtained when the particle size of the carbon material in the negative-electrode active material was the same as the particle size of the non-carbon material or slightly larger than the same and when the weight of the carbon material in the negative-electrode active material was the same as that of the non-carbon material or slightly heavier than the same. As a result, satisfactory resistance against cycle operations was obtained.

As described above, the Comparative Example 5 was structured such that the ratio $R_M/R_C$ was not higher than one and the ratio $W_M/W_C$ was higher than one. The battery according to Comparative Example 5 was structured such that the weight $W_M$ of the non-carbon material in the negative-electrode active material was larger than the weight $W_C$ of the carbon material, that is, the ratio $W_M/W_C$ was higher than one. As compared with the bag to Example 1 structured such that the weight $W_M$ of the non-carbon material in the negative-electrode mix was lighter than the weight $W_C$ of the carbon material, the discharge-ratio retention ratio of the battery according to Comparative Example 5 was not higher than half.

The reason for this was considered as follows. If change in the volume of the non-carbon material occurred in Comparative Example 5 when lithium was doped/dedoped, the carbon material was impossible to absorb the change in the volume because the quantity of the carbon material was too small. Thus, prevention of the change in the overall volume of the negative-electrode active material was impossible.

Therefore, the structure was employed in which the particle size of the carbon material in the negative-electrode active material was the same as that of the non-carbon material or slightly larger than the same. Moreover, the weight of the carbon material in the negative-electrode active material was the same as that of the non-carbon material or slightly heavier than the same. Thus, change in the volume of the negative-electrode active material was prevented. As a result, satisfactory resistance against cycle operations was obtained.

The batteries according to Examples 1 to 5 were structured such that the particle size of the carbon material in the negative-electrode active material was larger than the particle size of the silicon compound. The battery according to Comparative Example 1 was structured such that the particle size of the carbon material was smaller than the particle size of the silicon compound. As compared with the battery according to Comparative Example 1, the discharge-ratio retention ratio of the Example 1 was significantly improved.

The reason for this was considered as follows: if change in the volume of the silicon compound occurs when lithium is doped/dedoped, the carbon material absorbed the change in the volume of the silicon compound. As a result, change in the overall volume of the negative-electrode active material was prevented.

Therefore, the structure in which the particle size of the carbon material in the negative-electrode active material was larger than the particle size of the silicon compound was able to prevent change in the volume of the negative-electrode active material. Thus, satisfactory resistance against cycle operations was realized.

In the present invention, the particle size ratio between the non-carbon material and the carbon material and the weight ratio between the non-carbon material and the carbon material were specified. Thus, the material for the negative electrode can be obtained which is able to prevent change in the volume occurring when lithium is doped/dedoped.

Moreover, the present invention is structured such that the particle size ratio between the silicon compound and the carbon material is specified. Thus, the material for the negative electrode can be obtained which is capable of prevent change in the volume occurring when lithium is doped/dedoped.

According to the present invention in which the foregoing material for the negative electrode is employed, the resistance against cycle operations can significantly be improved. As a result, an excellent nonaqueous-electrolyte battery can be realized.

Although the invention has been described in its preferred form and structure with a certain degree of particularity it is understood that the present disclosure of the preferred form can be changed in the details of construction and in the combination and arrangement of parts without departing from the spirit and the scope of the invention as hereinafter claimed.

What is claimed is:

1. A material for a negative electrode comprising:
a mixture of a non-carbon material and a carbon material, wherein an average particle size of the non-carbon material is defined as $R_M$ and an average particle size of the carbon material is defined as $R_C$ such that a ratio $R_M/R_C$ is not higher than one,
wherein a weight of the non-carbon material is defined as $W_M$ and a weight of the carbon is defined as $W_C$ such that a ratio $W_M/W_C$ is not higher than one,
wherein the non-carbon material constitutes an alloy expressed by a general formula $Li_xMM'$ in association with lithium, where each of M and M' is an element except for Li and C and where a relationship that $x \geq 0.01$ is satisfied, and
wherein at least one of M and M' is an element selected from a group consisting of Si, Sn, Al and In.

2. A material for a negative electrode according to claim 1, wherein the carbon material contains at least one of a non-graphitizable carbon, a graphitizable carbon material and a graphite material.

3. A nonaqueous-electrolyte battery comprising:
a positive electrode containing a lithium composite oxide;
a negative electrode disposed opposite to the positive electrode and containing a mixture of a non-carbon material to which lithium is adapted to be doped/dedoped and a carbon material; and
a nonaqueous electrolyte disposed between the positive electrode and the negative electrode, wherein
an average particle size of the non-carbon material is defined as $R_M$ and an average particle size of the carbon material is defined as $R_C$ such that a ratio $R_M/R_C$ is not higher than one,
wherein a weight of the non-carbon material is defined as $W_M$ and a weight of the carbon is defined as $W_C$ such that a ratio $W_M/W_C$ is not higher than one,
wherein the non-carbon material constitutes an alloy expressed by a general formula $Li_xMM'$ in association with lithium, where each of M and M' is an element except for Li and C and where a relationship that $x \geq 0.01$ is satisfied, and
wherein at least one of M and M' is an element selected from a group consisting of Si, Sn, Al and In.

4. A nonaqueous-electrolyte battery according to claim 3 wherein the carbon material contains at least one of a non-graphitizable carbon, a graphitizable carbon material and a graphite material.

5. A material for a negative electrode comprising:
a mixture of a silicon compound and a carbon material, wherein an average particle size of the silicon material is defined as $R_{Si}$ and an average particle size of the carbon material is defined as $R_C$ such that a ratio $R_{Si}/R_C$ is not higher than one.

6. A material for a negative electrode according to claim 5, wherein the silicon compound is expressed by a general formula $M_xSi$, where M is an element except for Li and Si and where a relationship that $x \geq 0.01$ is satisfied.

7. A material for a negative electrode according to claim 6, wherein M is any one of B, C, N, O, Na, Mg, Al, P, S, K, Ca, Ti, V, Cr, Mn, Fe, Co, Ni, Cu, Zn, Rb, Y, Mo, Rh, Pd, In, Sn, Cs, Ba, Ce and Ta.

8. A material for a negative electrode according to claim 5, wherein the carbon material contains at least one of a non-graphitizable carbon, a graphitizable carbon material and a graphite material.

9. A material for a negative electrode according to claim 5, wherein the carbon material contains at least two types of materials selected from a group consisting of non-graphitizable carbon, graphitizable carbon and graphite.

10. A nonaqueous-electrolyte battery comprising:
a positive electrode containing a lithium composite oxide;
a negative electrode disposed opposite to the positive electrode and containing a mixture of a silicon compound and a carbon material; and
a nonaqueous electrolyte disposed between the positive electrode and the negative electrode, wherein
an average particle size of the silicon material is defined as $R_{Si}$ and an average particle size of the carbon material is defined as $R_C$ such that a ratio $R_{Si}/R_C$ is not higher than one.

11. A nonaqueous-electrolyte battery according to claim 10, wherein the silicon compound is expressed by a general formula $M_xSi$, where M is an element except for Li and Si and where a relationship that $x \geq 0.01$ is satisfied.

12. A nonaqueous-electrolyte battery according to claim 11, wherein M is any one of B, C, N, O, Na, Mg, Al, P, S, K, Ca, Ti, V, Cr, Mn, Fe, Co, Ni, Cu, Zn, Rb, Y, Mo, Rh, Pd, In, Sn, Cs, Ba, Ce and Ta.

13. A nonaqueous-electrolyte battery according to claim 10, wherein the carbon material contains at least one of a non-graphitizable carbon, a graphitizable carbon material and a graphite material.

14. A nonaqueous-electrolyte battery according to claim 10, wherein the carbon material contains at least two types of materials selected from a group consisting of non-graphitizable carbon, graphitizable carbon and graphite.

* * * * *